(12) United States Patent
Schwamberger et al.

(10) Patent No.: US 12,095,215 B2
(45) Date of Patent: Sep. 17, 2024

(54) ELECTRIC MOTOR WITH CONNECTING ELEMENT FOR A WINDING OF A STATOR ON A PRINTED CIRCUIT BOARD WITH AT LEAST TWO INSULATION DISPLACEMENT CONTACTS

(71) Applicant: NIDEC GPM GmbH, Auengrund OT Merbelsrod (DE)

(72) Inventors: Frank Schwamberger, Schleusingen (DE); Conrad Nickel, Troistedt (DE)

(73) Assignee: NIDEC GPM GMBH, Merbelsrod (DE)

( * ) Notice: Subject to any disclaimer, the term of this patent is extended or adjusted under 35 U.S.C. 154(b) by 339 days.

(21) Appl. No.: 17/618,807

(22) PCT Filed: Mar. 2, 2020

(86) PCT No.: PCT/EP2020/055430
§ 371 (c)(1),
(2) Date: Dec. 13, 2021

(87) PCT Pub. No.: WO2020/249269
PCT Pub. Date: Dec. 17, 2020

(65) Prior Publication Data
US 2022/0247141 A1 Aug. 4, 2022

(30) Foreign Application Priority Data

Jun. 14, 2019 (DE) .......................... 102019116257.2

(51) Int. Cl.
*H01R 43/04* (2006.01)
*H01R 12/53* (2011.01)
(Continued)

(52) U.S. Cl.
CPC ........... *H01R 43/048* (2013.01); *H01R 12/53* (2013.01); *H01R 4/2445* (2013.01); *H01R 2201/10* (2013.01)

(58) Field of Classification Search
CPC .. H01R 12/53; H01R 12/585; H01R 2201/10; H01R 4/2445; H01R 4/2456;
(Continued)

(56) References Cited

U.S. PATENT DOCUMENTS

| 4,084,877 A | * | 4/1978 | Knickerbocker | .... H01R 4/2429 439/402 |
|---|---|---|---|---|
| 4,391,484 A | | 7/1983 | Foederer | |

(Continued)

FOREIGN PATENT DOCUMENTS

| DE | 10 2004 027 380 A1 | 12/2005 |
|---|---|---|
| DE | 10 2011 121 943 A1 | 6/2013 |

(Continued)

OTHER PUBLICATIONS

EP-4280828-A1, Ball, all pages (Year: 2023).*
(Continued)

*Primary Examiner* — Naishadh N Desai
(74) *Attorney, Agent, or Firm* — Keating & Bennett, LLP

(57) ABSTRACT

An electric motor includes a rotor and a stator including a stator core and coils. The coils are defined by a winding wire including winding wire ends electrically contacted with a printed circuit board at an end surface through connectors. The connectors each include at least two insulation displacement contacts receiving a winding wire end of a stator winding. Each connector includes a single electrical connection to the printed circuit board. The connector includes a base body with an underside in contact with the printed circuit board. Each of the at least two insulation displacement contacts includes a clamping slot perpendicular to the
(Continued)

underside of the base body. The clamping slots are defined by spaced legs extending from the base body, at least two of the spaced legs being resilient.

5 Claims, 2 Drawing Sheets

(51) Int. Cl.
*H01R 43/048* (2006.01)
*H01R 4/2445* (2018.01)

(58) Field of Classification Search
CPC .. H01R 43/048; H02K 11/33; H02K 2203/03; H02K 3/50
See application file for complete search history.

(56) References Cited

U.S. PATENT DOCUMENTS

| | | | | |
|---|---|---|---|---|
| 2008/0073986 | A1* | 3/2008 | Lee | H02K 11/33 310/58 |
| 2010/0093197 | A1* | 4/2010 | Sander | H05K 3/308 439/82 |
| 2011/0057524 | A1 | 3/2011 | Andrieux et al. | |
| 2012/0270432 | A1* | 10/2012 | Jaeckle | H01R 4/58 439/397 |
| 2017/0018992 | A1* | 1/2017 | Li | H02K 3/522 |
| 2017/0104378 | A1* | 4/2017 | Dawson | H02K 15/0081 |

FOREIGN PATENT DOCUMENTS

| | | | |
|---|---|---|---|
| DE | 10 2012 106 471 A1 | 2/2014 | |
| DE | 202014005789 U1 * | 12/2015 | H02K 3/522 |
| EP | 2 212 985 B1 | 5/2011 | |
| EP | 4280828 A1 * | 11/2023 | H01R 12/585 |
| GB | 2 058 485 A | 4/1981 | |

OTHER PUBLICATIONS

Official Communication issued in International Patent Application No. PCT/EP2020/055430, issued on Dec. 14, 2021.

English translation of Official Communication issued in International Patent Application No. PCT/EP2020/055430, mailed on May 19, 2020.

Official Communication issued in International Patent Application No. PCT/EP2020/055430, mailed on May 19, 2020.

* cited by examiner

ELECTRIC MOTOR WITH CONNECTING ELEMENT FOR A WINDING OF A STATOR ON A PRINTED CIRCUIT BOARD WITH AT LEAST TWO INSULATION DISPLACEMENT CONTACTS

CROSS REFERENCE TO RELATED APPLICATIONS

This is a U.S. national stage of PCT Application No. PCT/EP2020/055430, filed on Mar. 2, 2020, and with priority under 35 U.S.C. § 119(a) and 35 U.S.C. § 365(b) being claimed from German Application No. 10 2019 116 257.2, filed Jun. 14, 2019, the entire disclosures of which are hereby incorporated herein by reference.

FIELD OF THE INVENTION

The present invention relates to an electric motor including a connector electrically connecting a winding of a stator to a printed circuit board.

BACKGROUND

Electric motors include a rotor connected to a motor shaft and rotatably mounted in a housing. The rotor is provided with permanent magnets. A stator is arranged in or around the rotor, which carries a number of windings on an iron core. When suitably controlled, the windings produce a magnetic field which drives the rotor to rotate. The windings are usually wound in three phases and are accordingly provided with three electrical connections via which the windings can be connected to a control unit (ECU). For this purpose, the windings are conventionally contacted with a printed circuit board on which the control unit is arranged. Contact is made by means of welded and soldered connections or by means of insulation displacement contacts (IDC).

SUMMARY

Example embodiments of the present disclosure provide a connector of an electrical connection of a winding of a stator to a printed circuit board, which connector enables contacting that is as simple as possible and has a long service life.

An electric motor according to a example embodiment of the present disclosure includes a rotor, which is mounted rotatably about an axis of rotation, and with a stator, which includes a stator core and coils wound on the stator core, the windings being defined by a winding wire with winding wire ends, and the winding wire ends being electrically contacted with a printed circuit board at an end surface by way of connectors. The connectors each include at least two insulation displacement contacts, in each of which a single winding wire end of a stator winding is received. Each connector includes a single electrical connection to the printed circuit board. The connector combines the winding wire ends into one electrical connection to the circuit board, thus space can be saved and the number of electrical connections can be reduced. The insulation displacement connectors enable a long-lasting contacting of the winding wires. The electrical connection is preferably a solder connection or a single press-fit contact.

The connector further includes a base body which, in the assembled state, lies with its underside in contact with the printed circuit board, and the at least two insulation displacement contacts each include a clamping slot which is oriented perpendicularly to the underside of the base body. The winding wire ends are thus particularly easy to insert into the slots. The slots are preferably aligned parallel or substantially parallel to each other.

The clamping slots are defined by spaced legs extending from the base body, at least two legs being resilient.

In one example embodiment, two clamping slots are defined by three legs, with a middle leg being a portion of both insulation displacement contacts. This middle leg is preferably rigid. However, each insulation displacement contact may instead include two legs and that all the legs are spaced apart.

It is advantageous if winding ends accommodated in the at least two insulation displacement contacts of a connector are assigned to one motor phase. Since there is no need for insulation between the contacts, the wire diameter of the winding wires can be increased, which increases the current carrying capacity per motor phase. Preferably, only two insulation displacement contacts are provided per connector.

The above and other elements, features, steps, characteristics and advantages of the present disclosure will become more apparent from the following detailed description of the example embodiments with reference to the attached drawings.

BRIEF DESCRIPTION OF THE DRAWINGS

Example embodiments of the present disclosure are explained in more detail below with reference to the drawings. Similar or similarly acting components are designated in the figures with the same reference signs.

DETAILED DESCRIPTION

Figure 1:
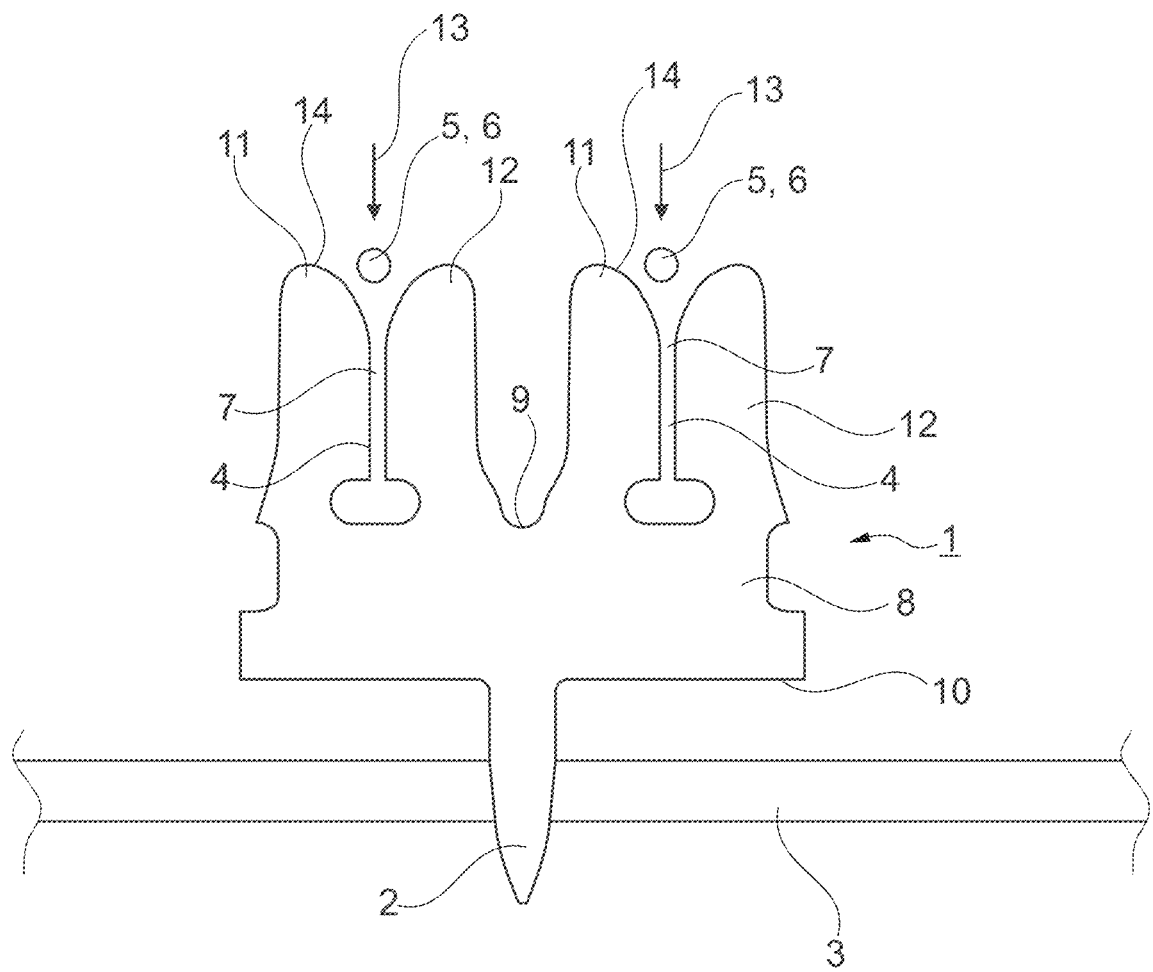
FIG. 1 is a longitudinal section through a connector with two insulation displacement contacts according to an example embodiment of the present disclosure.
Figure 2:
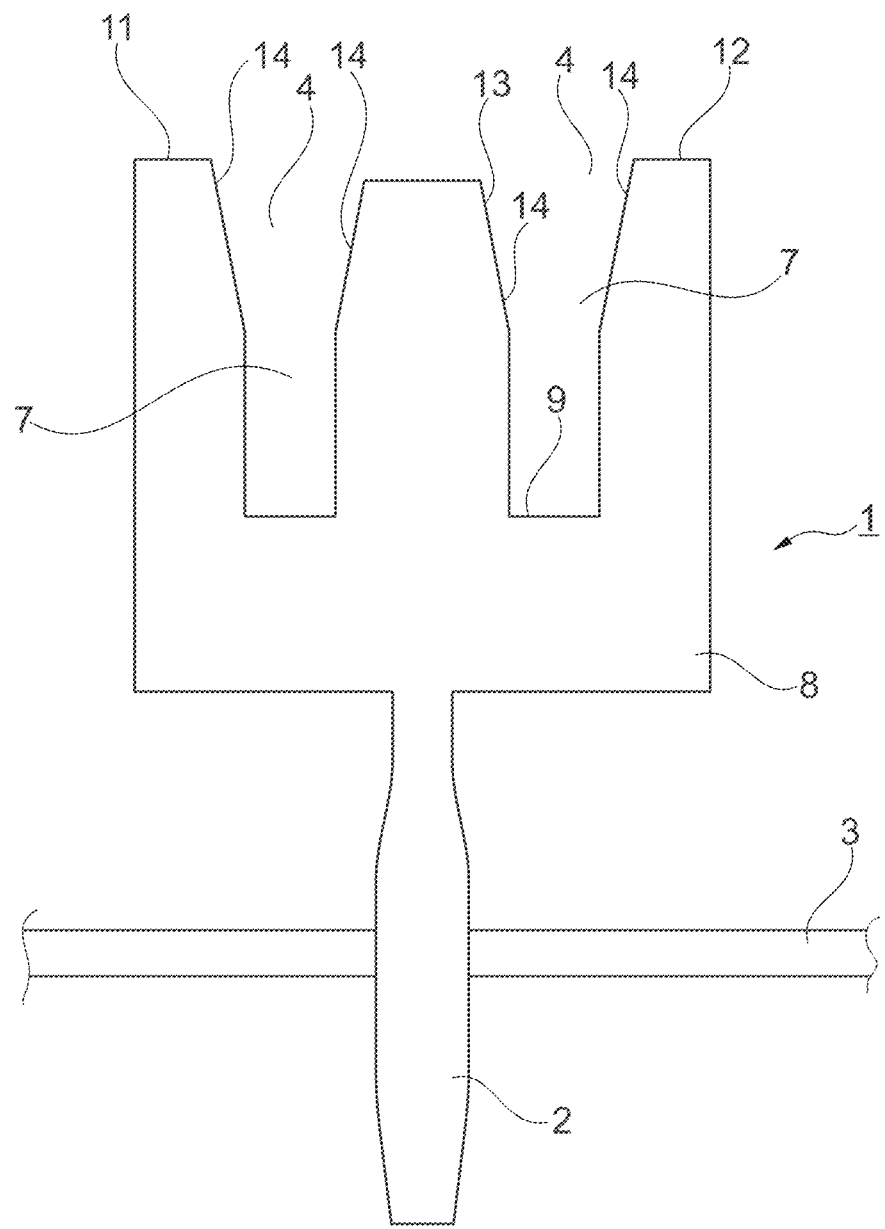
FIG. 2 is a longitudinal section through a connector with two insulation displacement contacts according to a further example embodiment of the present disclosure.

The connectors 1 shown in FIGS. 1 and 2 have in common that they comprise a single press-fit contact 2 for making electrical contact with a printed circuit board 3, and two insulation displacement contacts 4 for respectively receiving an end portion 5 of a winding wire 6 of a stator of an electric motor.

The insulation displacement contacts (IDC) 4 have clamping slots 7. A sharp contact in the clamping slots 7 cuts the insulation of the winding wire ends 5 and achieves electrical contacting of the wire core of the winding wire 6.

Since only one press-fit contact 2 is provided, this results in a much more compact design compared to the use of two separate connectors, each with a press-fit contact. Each clamping slot 7 accommodates only one winding wire end 5. This has the advantage that a defined gap geometry is present before the winding wire end 5 is pressed in. In addition, this results in better contact reliability, which remains even after aging and vibration loading of the connector 1.

The two end sections 5 contacted in one connector 1 are associated with one phase of the electric motor. Since there is no need for insulation between the contacts, the wire diameter of the winding wires can be increased, thus increasing the current carrying capacity per motor phase.

As shown in FIG. 1, the connector 1 preferably has a flat base body 8 with two opposite end faces 9, 10. A first end face 10 rests on the printed circuit board 3 over a large area in the state in which it is attached to the printed circuit board 3. The press-fit contact 2 is formed on this first end face 10. The two insulation displacement contacts 4 are arranged on the second end face 9, each of which is formed by two legs 11, 12 extending away from the base body 8. A clamping slot 7 is arranged between each two legs 11,12. The legs 11,12 are all arranged spaced apart from each other. The clamping slot 7 is arranged approximately perpendicular to the surface of the printed circuit board 3 and to the first end face 10 of the base body 8. In each case, one wire is inserted into one insulation displacement contact 4 or clamping slot 7. The direction of insertion is shown schematically by the arrows 13. The legs 11,12 are preferably elastic in order to allow a permanent and stable pressing of the winding wire 6 in the clamping slot 7. The clamping slot 7 has a sharp contact area inside on the surface of the legs, which strips the winding wire 6 when the winding wire 6 is pressed in and passed. The clamping slots 7 have an insertion and press-in chamfer 14.

FIG. 2 shows a further example embodiment. In contrast to the example embodiment of FIG. 1, only three spaced legs 11,12,13 are arranged on the second end face 9 of the base body 8. The two insulation displacement contacts 4 share the middle leg 13. This middle leg 13, which lies between the two outer legs 11,12 and thus forms two clamping slots 7, is rigidly designed. In order to enable the winding wire ends to be permanently pressed into the clamping slots 7, the two outer legs 11,12 are of resilient design. The clamping slots 7 also have insertion and press-in chamfers 14.

In a further example embodiment, depending on the application, it may also be provided that the connector has more than two insulation displacement contacts.

In general, the connector may not have a press-fit contact, but may be soldered directly to the printed circuit board.

The winding wire is preferably formed of enameled copper wire.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An electric motor, comprising:
a rotor rotatable about an axis of rotation;
a stator including a stator core and coils wound on the stator core, the coils being defined by a winding wire with winding wire ends;
connectors; and
a printed circuit board including an end surface electrically contacted with the winding wire ends through the connectors; wherein
each of the connectors includes at least two insulation displacement contacts accommodating the winding wire ends;
each of the connectors includes a single electrical connection to the printed circuit board;
each of the connectors includes a base body which, in an assembled state, has an underside in contact with the printed circuit board, opposed lateral ends of the base body include recessed curved cavities defined therein below the at least two insulation displacement contacts;
each of the at least two insulation displacement contacts includes a clamping slot perpendicular to the underside of the base body, and the clamping slots are defined by spaced legs which extend from the base body;
at least two of the spaced legs are resilient;
the connectors are each defined by respective single one piece members; and
only a single portion of the connectors extends entirely through the printed circuit board.

2. The electric motor according to claim 1, wherein the electrical connection is a solder connection or a single press-fit contact.

3. The electric motor according to claim 1, wherein two of the clamping slots are defined by three of the legs, a middle leg of the three of the legs defining a portion of the at least two insulation displacement contacts.

4. The electric motor according to claim 3, wherein the middle leg of the three of the legs is rigid.

5. The electric motor according to claim 1, wherein the winding ends accommodated in the at least two insulation displacement contacts correspond to a single motor phase.

* * * * *